No. 664,476. Patented Dec. 25, 1900.
J. B. HALL.
FISH HOOK.
Application filed Aug. 27, 1900.
(No Model.)
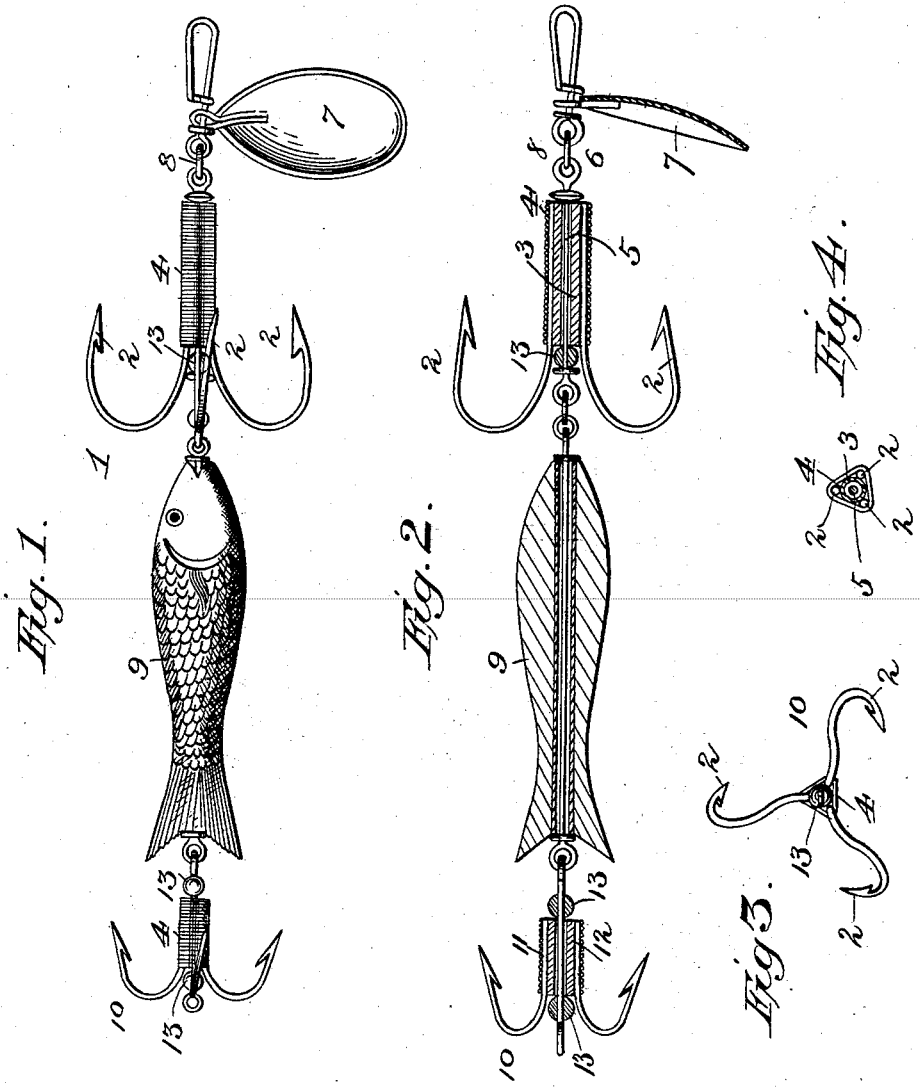

UNITED STATES PATENT OFFICE.

JAMES BASCOM HALL, OF CLEVELAND, OHIO.

FISH-HOOK.

SPECIFICATION forming part of Letters Patent No. 664,476, dated December 25, 1900.

Application filed August 27, 1900. Serial No. 28,218. (No model.)

*To all whom it may concern:*

Be it known that I, JAMES BASCOM HALL, a citizen of the United States, residing at Cleveland, in the county of Cuyahoga and State of Ohio, have invented certain new and useful Improvements in Fish-Hooks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to fish-hooks, and more particularly to that class of hooks used in trolling; and it has for one of its objects to provide such a hook with a substantially non-rotatable lure or bait and guarding it with one or more sets or series of hooks so arranged as to be automatically rotatable and substantially invisible in the clearest water.

Another object of the invention is to flexibly connect the lure and the hooks, so that the parts may freely move upon each other, and thus prevent the lure from interfering with the free action of the hooks in engaging with the fish.

With these objects in view my invention consists in the improved construction and novel arrangement of parts of a trolling-hook, as will be hereinafter more fully set forth.

In the accompanying drawings, in which the same reference-numerals indicate corresponding parts in each of the views in which they occur, Figure 1 is a side elevation of a trolling-hook made in accordance with my invention. Fig. 2 is a longitudinal sectional view of the same. Fig. 3 is an end elevation of one of the sets of hooks, and Fig. 4 is a transverse sectional view of the same.

Referring more particularly to the drawings, 1 indicates the set of hooks, which is preferably formed from three hooks 2, the stems of which are secured in any suitable manner upon the sides of a tube or sleeve 3, as by means of a wrapping of wire 4 or other suitable material. The points of the hooks are arranged at a slight inclination or spiral to the axis of the tube, so that as the hook is drawn through the water it will be automatically rotated upon its axis—that is, without the use of spinners or other separate appliances.

The hook is mounted upon a suitable support or shaft 5, which is connected with the line by the ordinary snell or attaching-wire 6 and is normally stationary or non-rotatable. If desired, a spoon 7 may be rotatably mounted upon the snell in the usual manner. Secured to the rear end of the shaft, as by means of a link 8, is a lure 9 of any suitable character, a minnow being shown in the drawings. This construction places the head of the minnow directly to the rear of the hooks, but in such a position as not to interfere with the free and rapid rotation of the hooks.

If desired, an additional set of hooks 10 may be flexibly secured to the rear of the lure, and they may have the hooks or barbed portions bent at an angle to the axis of the sleeve 11, upon which they are secured, and thereby cause the rotation of said sleeve and hooks upon the shaft 12, on which they are mounted. Beads 13 or other antifriction devices may be placed at either or both ends of the sleeves carrying the hooks to prevent wearing or chafing of the parts and also to reduce the friction of the rotating sleeve to a minimum.

In using my improved hook it is fastened to the line in the usual manner and cast into the water and drawn forward in the manner common with the use of such hooks. As it passes through the water the twist or lateral bend of the points of the hooks to the right or left will cause the hooks to be rapidly rotated in one direction or the other. In this manner the hook operates automatically and virtually becomes invisible and apparently leaves the lure or bait entirely uncovered. By mounting the lure upon a shaft it virtually remains immovable in the water—that is, it does not rotate—and thus appears more like a live minnow.

As it is well known that all game fish strike for the head of the minnow, I prefer to make the hooks of the set in front of the bait larger than the others, although the larger hooks may be placed to the rear.

In using devices in which artificial means are employed for covering or hiding the hooks it is well known that the fish frequently detects the deception before striking for the bait, and thereby renders the hook a failure. Further than this, it frequently happens that the hook engages with the fish in such an insecure manner that the fish frequently escapes after having been struck by the hook.

With my improved hook when the fish makes a strike for the bait the hooks are rotating so rapidly as to be virtually invisible to the fish, and when it reaches the bait from any possible direction the point of one of the hooks strikes it and catches it so securely as to prevent its escape, the flexible connection between the bait and the hooks permitting of the bait being struck and knocked to one side without changing the course of the hooks or preventing their engaging with the fish.

Although I have shown my hook as provided with the ordinary spoon or lure and also with an additional set of hooks to the rear, it is evident that it could be used without either of them and also that additional lures or sets of hooks could be used without departing from the spirit of my invention, and I reserve the right to make all such changes and alterations in the construction, and arrangement of parts of a hook as will come within the scope of my invention.

Having thus fully described my invention, what I claim as new, and desire to secure by Letters Patent of the United States, is—

1. In a fish-hook, a normally non-rotatable support, a lure connected therewith, and a rotatable set of hooks mounted on the support adjacent to the lure and adapted to be automatically rotated as the hook is drawn through the water.

2. In a fish-hook, a normally non-rotatable shaft, a set of hooks thereon arranged to automatically rotate upon the shaft as it is drawn through the water, and a lure secured to the shaft to the rear of the hooks.

3. In a fish-hook, a normally non-rotatable shaft, a sleeve on the shaft, a set of hooks on the sleeve, the points of which are bent at an inclination or spiral to the axis of the shaft, whereby the set of hooks will be automatically rotated upon the shaft when drawn through the water, a lure flexibly secured to the rear of the hooks, and a set of hooks to the rear of the lure.

In testimony whereof I affix my signature in presence of two witnesses.

JAMES BASCOM HALL.

Witnesses:
ROY B. ROBINETTE,
W. J. GRADY.